US009584497B2

(12) United States Patent
Black et al.

(10) Patent No.: US 9,584,497 B2
(45) Date of Patent: Feb. 28, 2017

(54) MANAGING ACCESS TO A NETWORK

(75) Inventors: Chuck A. Black, Rocklin, CA (US);
Shaun Wakumoto, Roseville, CA (US);
Nathan Stanley Jenne, Lincoln, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 98 days.

(21) Appl. No.: 14/237,096

(22) PCT Filed: Aug. 26, 2011

(86) PCT No.: PCT/US2011/049402
§ 371 (c)(1),
(2), (4) Date: Feb. 4, 2014

(87) PCT Pub. No.: WO2013/032426
PCT Pub. Date: Mar. 7, 2013

(65) Prior Publication Data
US 2014/0165162 A1 Jun. 12, 2014

(51) Int. Cl.
*G06F 15/16* (2006.01)
*H04L 29/06* (2006.01)
*H04L 12/24* (2006.01)

(52) U.S. Cl.
CPC .......... *H04L 63/08* (2013.01); *H04L 41/0803* (2013.01); *H04L 63/10* (2013.01); *H04L 63/162* (2013.01); *H04L 63/20* (2013.01)

(58) Field of Classification Search
CPC ........ H04L 9/32; H04L 63/0892; G06F 21/30
(Continued)

(56) References Cited

U.S. PATENT DOCUMENTS 6,708,170 B1 * 3/2004 Byrne et al.
7,100,195 B1 * 8/2006 Underwood .......... G06F 9/4443
707/999.009

(Continued)

FOREIGN PATENT DOCUMENTS

KR 1020040033957 A 4/2004

OTHER PUBLICATIONS

Foundry Network, Oct. 2006, Deploying MAC Authentication with MS Authentication server, pp. 1-51.*

(Continued)

*Primary Examiner* — Dede Zecher
*Assistant Examiner* — Viral Lakhia
(74) *Attorney, Agent, or Firm* — Mannava & Kang, P.C.

(57) ABSTRACT

In a method of managing access to a network, a MAC based authentication operation is implemented in determining whether to grant a user device access to the network. In addition, a user is enabled to self-register a user device into a database of authorized users in response to the user being denied access through the MAC based authentication operation and being listed as a valid user in a directory of active network users. Moreover, the directory of active network users is monitored for modification of information pertaining to the users listed in the directory of active network users and the database of authorized users is modified in response to a determination that user information pertaining to at least one user listed in the directory of active network users that affects the database of authorized users has been modified.

13 Claims, 5 Drawing Sheets

(58) Field of Classification Search
USPC ...... 726/1–4, 22–27; 713/162; 709/222–224; 455/405.2
See application file for complete search history.

(56) References Cited

U.S. PATENT DOCUMENTS

| | | | | |
|---|---|---|---|---|
| 7,480,723 | B2* | 1/2009 | Grabelsky | H04L 29/06 709/204 |
| 7,596,614 | B2* | 9/2009 | Saunderson et al. | 709/224 |
| 7,933,410 | B2* | 4/2011 | Fahrny | H04N 21/4623 380/201 |
| 8,117,639 | B2* | 2/2012 | MacKinnon | H04L 63/0263 713/156 |
| 8,181,020 | B2* | 5/2012 | Flynn | G06F 9/4406 713/164 |
| 8,255,507 | B2* | 8/2012 | Spears | 709/223 |
| 8,316,447 | B2* | 11/2012 | Guruswamy | G06F 21/577 726/22 |
| 9,020,621 | B1* | 4/2015 | Proctor | H04R 5/04 700/94 |
| 9,213,836 | B2* | 12/2015 | Mayer | G06F 21/55 |
| 2007/0079384 | A1* | 4/2007 | Grinstein | G06F 21/629 726/27 |
| 2008/0092214 | A1* | 4/2008 | Zavalkovsky et al. | 726/4 |
| 2008/0125077 | A1* | 5/2008 | Velazquez et al. | 455/404.2 |
| 2009/0271850 | A1 | 10/2009 | Hoppe et al. | |
| 2010/0077447 | A1* | 3/2010 | Dholakia et al. | 726/3 |
| 2013/0091534 | A1* | 4/2013 | Gilde et al. | 726/1 |
| 2013/0091551 | A1* | 4/2013 | Rajakarunanayake et al. | 726/4 |
| 2014/0207917 | A1* | 7/2014 | Tock et al. | 709/220 |
| 2014/0215066 | A1* | 7/2014 | Kamat | H04L 63/08 709/225 |

OTHER PUBLICATIONS

"Deploying MAC Authentication with Microsoft Internet Authentication Service (RADIUS)," Foundary Security Best Practice, Foundary Networks (Oct. 10, 2006).
Agent-less Network Access Control for the Mobile Workforce, <http://emea.trendmicro.com/imperia/md/content/uk/products/datasheets/ds28_nvw2_0bro_060301_gb.pdf>, 2006.
Blaisdell, M., Tipping Point Network Access Control (NAC), Saint Francis University, <http://www.computerlinks.co.uk/FMS/173279.tippingpoint_nac.pdf>, Apr. 2009.
EC-1515, MAB; available at http://www.cisco.com/en/US/docs/ios/security/command/reference/sec_m1.pdf (Apr. 2011), See mac access-group, pp. 2-3.
Network Access Control (NAC), <http://enterasys.com/company/literature/nac-ds.pdf>, Mar. 2011.
Understanding Network Access Control, <http://www.enterasys.com/company/literature/enterasys-nac-guide.pdf>, Sep. 2008.

* cited by examiner

MANAGING ACCESS TO A NETWORK

BACKGROUND

User-oriented processing and communications devices, such as personal computers, laptop computers, cell phones, PDAs, printers, and similar devices are frequently connected to computer networks and/or communications networks. These may include corporate, educational, government, public access and other networks.

Network connectivity entails not just a physical connection, such as a hardwired coupling or a coupling via a wireless connection, but also software based authorization to access network resources. Such authorized access typically provides the ability for a user device to communicate over the network, access and use other devices on the network such as printers, and possibly to access various database and other information resources on the network, such as e-mail. In order to ensure the security of a network, it is important to ensure that only authorized network users and devices are permitted to obtain access to network resources.

Establishing, maintaining, monitoring, and controlling network access rights for users and user devices can be, amongst other things, complex, time-consuming, and expensive. Existing network access solutions are often so complex that many features are not put to use, or the solutions are not actually used at all. Of note is that configuring a network to recognize each particular hardware device which may be allowed to have network access is a particularly daunting task using many network administration tools. This renders networks vulnerable to access by unauthorized users and/or unauthorized devices.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
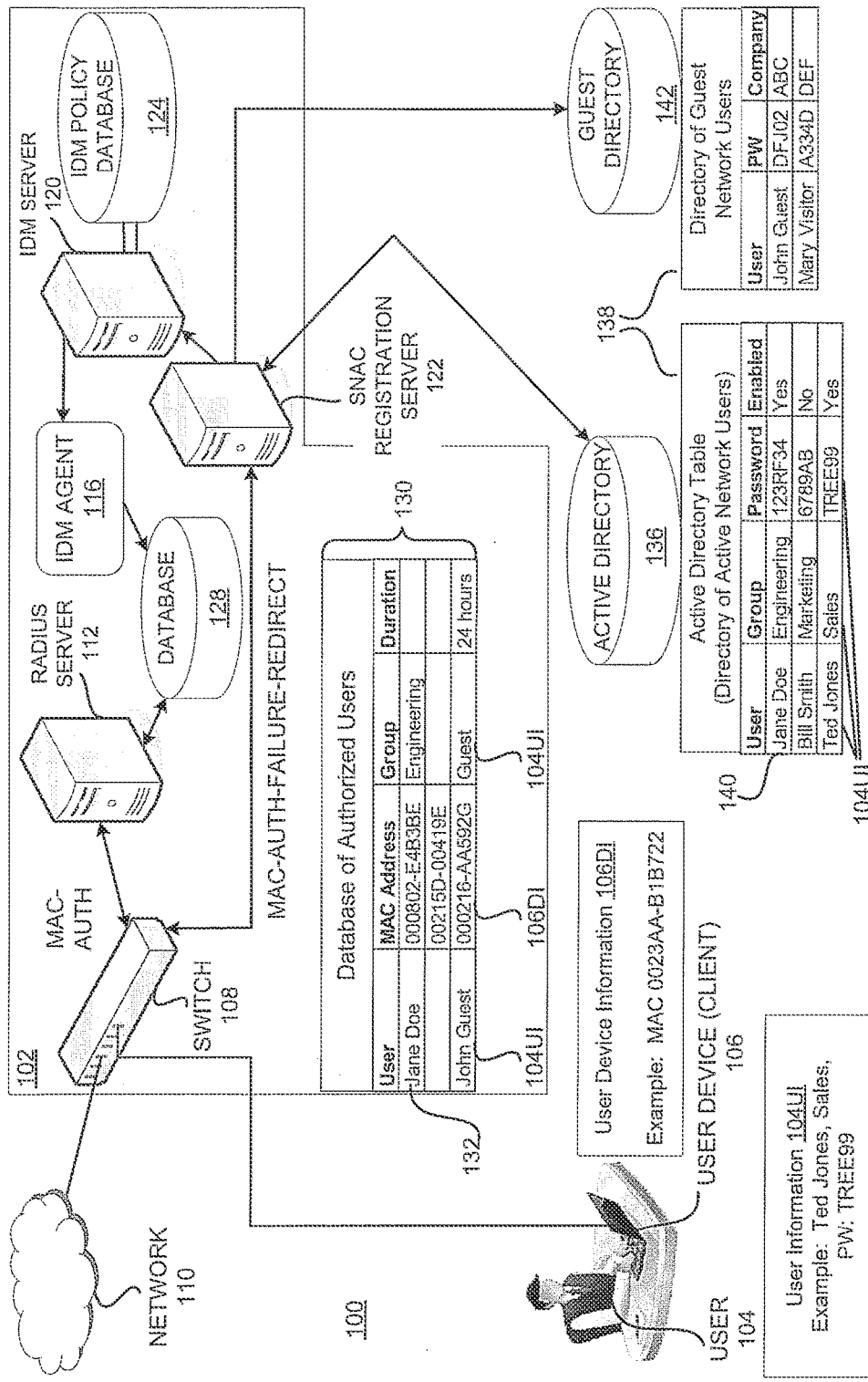
FIG. 1 shows a functional block diagram of an environment in which a network device for managing access to a network by a user device may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

There are a relatively large number of Network Access Control (NAC) implementations in the market. Some of these implementations are geared toward enterprises with large IT staffs. Other ones of the solutions are geared toward midrange enterprises with limited IT staffs, which must often rely on system integrators to install, configure, and maintain the implementation. All of the available implementations are complex and difficult to operate.

Disclosed herein are methods and apparatuses for managing access to a network that requires a substantially minimal amount of administrative overhead. In other words, the methods and apparatuses disclosed herein substantially remove the need for large IT staffs or external consultants. The NAC implementation disclosed herein is referred to as Simplified Network Access Control (SNAG), but other names may be employed as well. As disclosed herein, SNAC may simplify NAC for both the client (end user) and the system and/or domain administrators. According to an example, SNAG may simplify NAG for clients by providing a client service portal for self-registration, which allows clients to register for access to the network with the appropriate access rights and quality of service. In addition, SNAC may simplify NAC for the administrator as well, by substantially removing the need for learning and mastering a number of external technologies:

Does not need to become an expert in RADIUS servers.
Does not need to become an expert in directory services (e.g. Active Directory).
Does not need to become an expert in 802.1X technology.

Additionally, in conventional NAC implementations, the administrator is typically required to perform the initial and ongoing maintenance of all the clients that want access to the network. Typically, there is an initial bulk configured process, followed by ongoing updating (adding new clients, deleting old clients, updating clients for changes to access rights). The SNAC implementation disclosed herein removes this burden from the administrator through the self-registration capability and automated updating of the user& access rights. In addition, through use of a separate database of authorized users, the SNAC implementation disclosed herein enables network access control to be based upon information contained in the directory of active network users, such as, the Active Directory, without making changes to the Active Directory.

According to an example, the user self-registration operation disclosed herein enables the user to self-populate the database of authorized users if the user is able to be verified in the directory of active network users. The active network users contained in the directory of active network users are users who exist in the existing Domain. In this regard, the active network users have been granted access rights to the network, whether or not those access rights are actually being exercised by the active users, that is, whether or not those users have user devices connected to the network. A user is typically understood to be a person, though a user may be some other kind of entity. A user device is typically understood to be an electronic computer or computing device, or other electronic information device, and/or a communications device, such as a cell phone. Other types of electronic devices pertaining to data or information processing, such as printers or PDAs, may be user devices as well.

The directory of active network users includes data of the types typically used to define and authorize a user who may be allowed network access. Such information may include, for example and without limitation, a user name, a user company, a user group or department, a user e-mail address, a user password, a user phone number, and similar information pertaining to the user. The list of authorized users is to include data of a type typically used to define and authorize a user, at least some of which may overlap with the data type(s) listed in the directory of active network users. Such overlapping data may include, for example and without limitation, a user name, a user company, a user group or department, and similar information.

The list of authorized users is also to include user device information for computing devices, data processing devices, communications devices, and similar devices which a user may use. The user device information may include, for example and without limitation, a MAC (media access control address) for a device, or a port connection identification for a device. For each user in the list of authorized users, associated user device information, such as MAC address(es), may be listed as well, indicating the hardware device(s) is/are associated with the user.

A user device may be physically coupled to the network, for example through a network switch. At substantially the same time that the user device is coupled to the network, the network receives from the user device the user device information, for example, a MAC address, through an automated device handshake process. If this user device information is currently listed in the list of authorized users, the user device is considered authorized and is granted access to the network. However, if the user device information is not listed in the list of authorized users, the user may be presented with an interface for entry of user self-registration information. The interface may be a graphical user interface, and may be presented via the user device, which has been coupled to the network, but may be presented via other devices as well. The user interface presents data fields or other sections for the entry of user information including, for example and without limitation, a user name, a user password, a user company, a user group, and similar information.

According to an example, a network device receives the user self-registration information and determines whether the user self-registration information is listed in the directory of active network users. If the user is listed in the directory of active network users, the hardware self-identification information is listed in the list of authorized users, and the user device is granted network access. As a result, when the user device is physically coupled to the network on future occasions, the user device information need not be requested again because the user device information is automatically recognized as being listed in the list of authorized users, and the user device is automatically granted network access.

Further, a real-time monitor may be maintained on the directory of active network users and any changes made by system and/or domain administrators to the directory of active network users may automatically result in appropriate changes to the list of authorized users, and to network access for the associated devices listed in the list of authorized users. This further simplifies network access security and control for system and/or domain administrators.

With reference to FIG. 1, there is shown a functional block diagram of an environment 100, in which a network device for managing access to a network 110 by a user device 106 may be implemented, according to an example. It should be readily apparent that the diagram depicted in FIG. 1 represents a generalized illustration and that other components may be added or existing components may be removed, modified or rearranged without departing from a scope of the environment 100.

FIG. 1 depicts a system 102, which may be referred to as a Simplified Network Access Control (SNAC) system, but other names may be employed as well. The system 102 is depicted as including a network switch 108, an Identity Driven Manager (IDM) server 120 for hosting DM modules (not shown), a SNAC registration server 122 for hosting SNAC modules (not shown). In addition, the SNAC registration server 122 is depicted as being in communication with an Active Directory (AD) 136 and a guest directory 142. The network switch 108 is also depicted as being in communication with a network 110, which may include network servers and devices.

FIG. 1 also depicts a user device 106, also known as a client or network client 106. User devices 106 are used by users 104, who are people or other entities seeking to log into and access the network 110. A user 104 seeking to utilize resources of a network 110 will connect their user device 106 to the switch 108 or other connection element, such as a wireless access point (not shown). Associated with the user 104 is user information 104UI. Associated with the user device 106 is user device information 106DI.

The switch 108 is depicted as communicating with a Remote Authentication Dial In User Service (RADIUS) server 112, in which the switch 108 operates as a RADIUS client. More particularly, the RADIUS server 112 may employ RADIUS, which is a networking protocol that provides authentication, authorization, and accounting management for network access, for instance, as described in RFC 2865 and 2866. In addition, the switch 108 may operate as a RADIUS client to the RADIUS server 112. The RADIUS server 112 is also depicted as being in communication with a database of authorized users 128, which may host a list of authorized users 130. An example list of authorized users 130 is depicted in FIG. 1 to include fields for a user name, a MAC address, a user group, and a duration of network access. Although not shown in FIG. 1, the list of authorized users 130 may include other fields. According to an example, a user device 106 attempting to gain access to the network 110 may be denied access to the network 110 unless the user device information 106DI of the user device 106 is listed in the list of authorized users 130.

An IDM agent 116, which provides management for an IDM policy database 124, is also depicted as being in communication with the database of authorized users 128. In addition, the IDM agent 116 is depicted as being in communication with the IDM server 120, which may host an IDM policy database 124. The IDM policy database 124 may contain a variety of tables and data defining user access rights and user access policies for various network users 104 and user devices 106.

According to other examples, the RADIUS server 112 and/or the IDM agent 116 may be hosted on the switch 108 or hosted on the IDM server 120, or on a combination of both. In addition, or alternatively, the RADIUS server 112 and/or the IDM agent 116 may be hosted on the SNAC registration server 122. As a further example, the IDM server 120 and the SNAC registration server 122 may comprise a common server and the RADIUS server 112 and/or the IDM agent 116 may be hosted on the common server.

The Active Directory 136 is depicted as including a directory table of active network users 138. The Active Directory 136 may be populated by an administrator, and functions to list users who are currently considered as having an active or valid association with a network 110. An example Active Directory table 138 is depicted in FIG. 1, which may have at least one data field or data type in common with the list of authorized users 130, or may have pointers or similar arrangements, to associate users 140 in the Active Directory table 138 with users 132 in the list of authorized users 130. In FIG. 1, the list of authorized users 130 and the Active Directory table 138 have in common two user fields 104UI, the User field and the Group field. In this way, it is possible to identify in the Active Directory table 138 a user who may potentially be listed for entry in the list of authorized users 130.

In FIG. 1, for example, both Jane Doe 132 and Jane Doe 140 are the same user listed in the respective list of authorized users 130 and the Active Directory table 138. The Active Directory table 138 may also include additional identifying information, which may be used to validate a user during a self-registration or login process. For example, the Active Directory table 138 is depicted as containing a password field, which may in part contribute to verifying a user who is attempting to access the network 110. The Active Directory table 138 may also contain a field or flag to indicate if a user listing is currently enabled. If enabled, the user is allowed network access. If disabled, the user is denied network access. This may be used to temporarily disable network access without a need to delete all user information 104UI. Other fields and flags (not shown) may also be employed to determine other aspects of network access for a user or user group.

According to an example, the switch 108 may be a conventional switch, which is not configured to host or support the RADIUS server 112 or the IDM agent 116. In such a case, the RADIUS server 112, the database of authorized users 128, and the IDM agent 116 may all be hosted on the SNAC registration server 122 and/or the IDM server 120. In an alternative example, the RADIUS server 112, the IDM agent 116, the database of authorized users 128, and the IDM policy database 124 may all be hosted on the switch 108. Therefore, the system 102 as depicted in FIG. 1, including the switch 108, the SNAC registration server 122, the IDM server 120, may instead include one of the switch 108, the SNAC registration server 122, or the IDM server 120 without the other components.

It should be further noted that the boundaries of the system 102, as suggested by the outlined area in FIG. 1, are example boundaries only. For example, the Active Directory 136 and/or the Guest Directory 142 may be considered part of the system 102.

Figure 2:
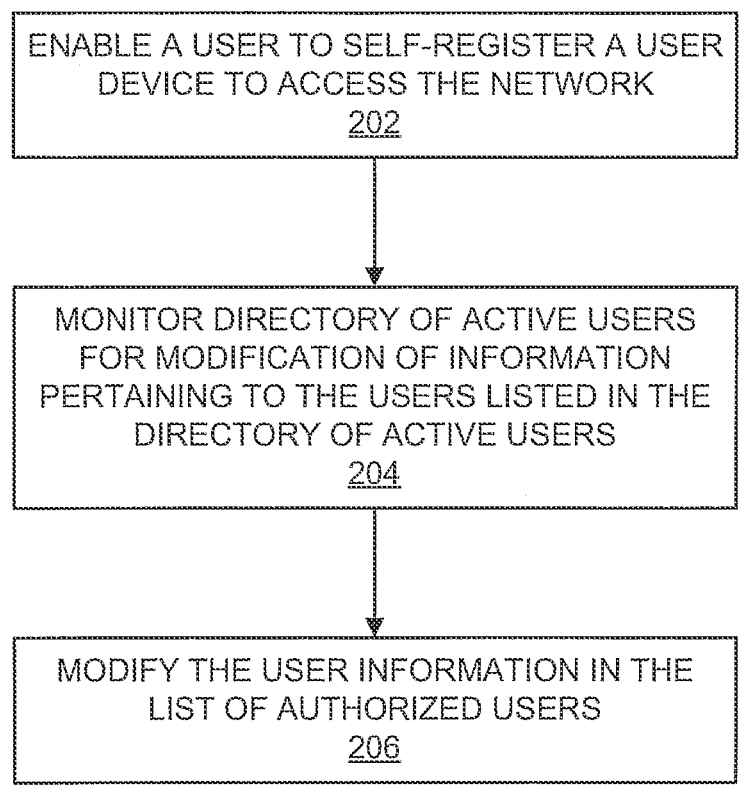
FIG. 2 depicts a flow diagram of a method for managing access to a network, according to an example of the present disclosure.
Figure 3:
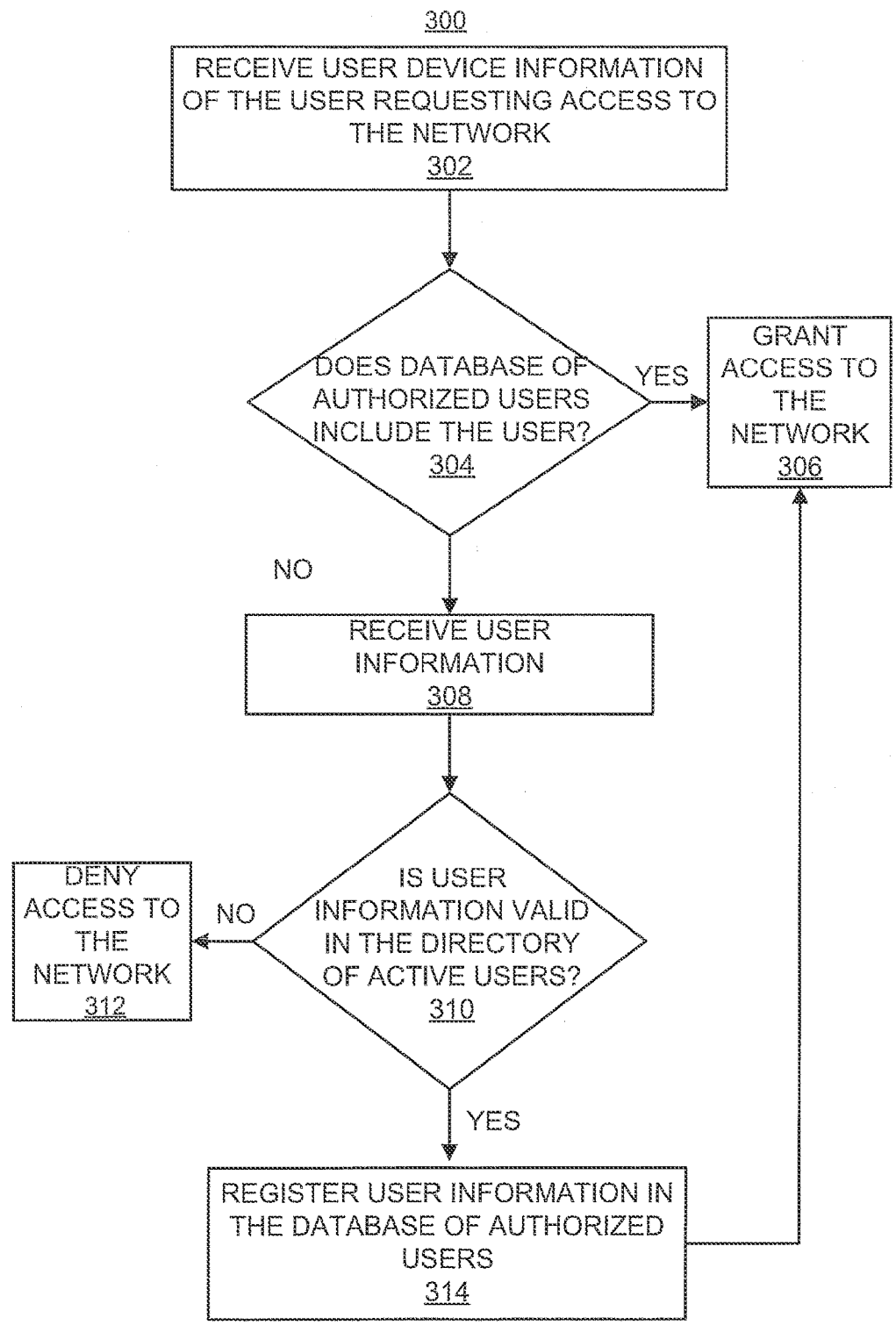
FIG. 3 depicts a flow diagram of a method for enabling a user to self-register a user device into a database of authorized users to access a network, according to an example of the present disclosure.
Figure 4:
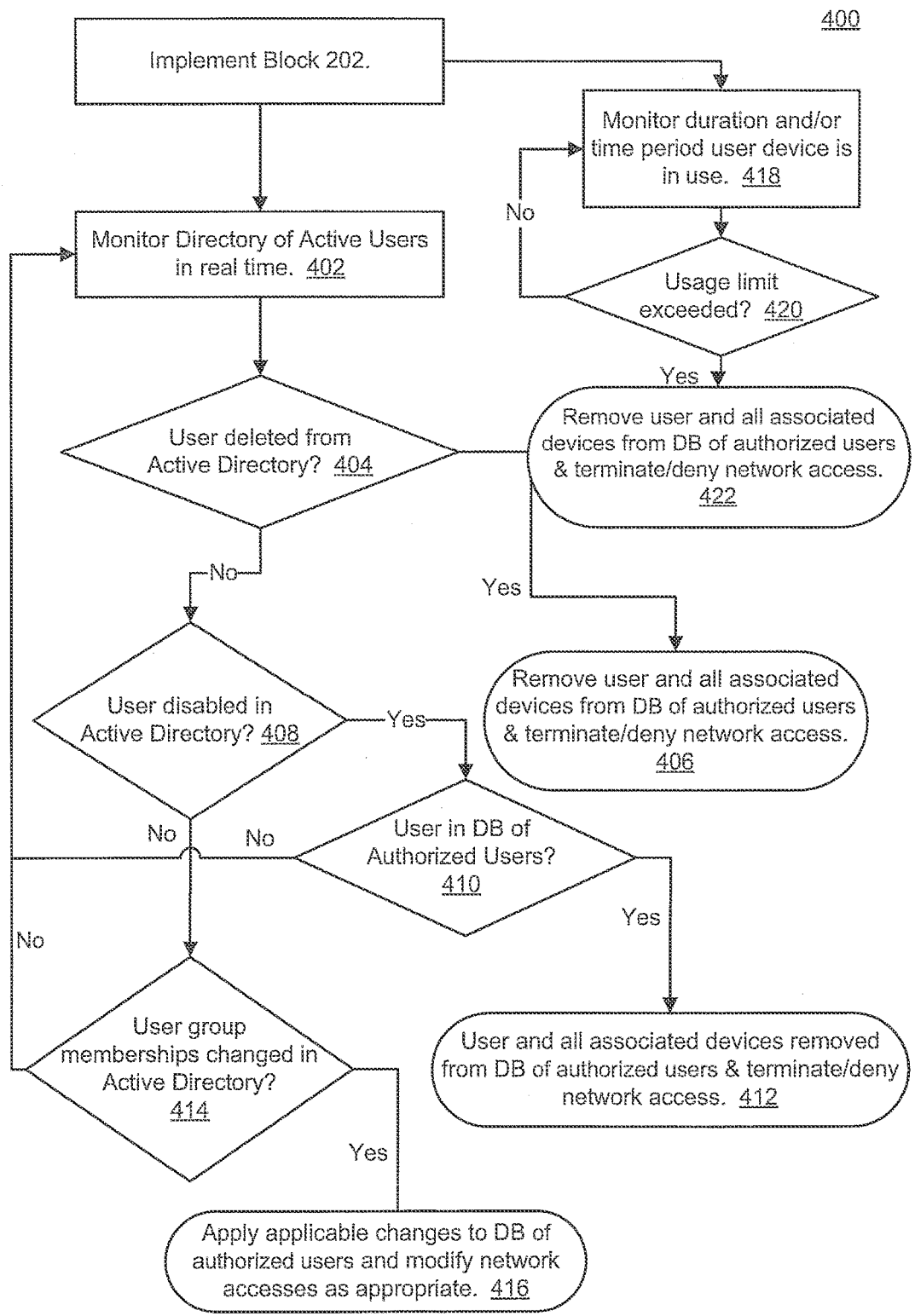
FIG. 4 depicts a flow diagram of a method for ongoing management of a user and user device already granted access to a network, according to an example of the present disclosure.

Various manners in which a simplified network access control management operation may be implemented are discussed with respect to the methods 200-400, respectively depicted in FIGS. 2-4. It should be readily apparent that the methods 200-400 depicted in FIGS. 2-4 represent generalized illustrations, and that other processes may be added or existing processes may be removed, modified or rearranged without departing from the scope and spirit of the methods 200-400.

Generally speaking, the various operations depicted and discussed with respect to FIGS. 2-4 may be implemented by at least one of the components of the system 102 depicted in FIG. 1. Thus, for instance, the switch 108, the SNAC registration server 122, or the IDM server 120, or a combination of these components may implement each of the operations depicted in FIGS. 2-4. In this regard, the methods 200-400 may comprise machine-readable instructions stored on any one or more of the switch 108, the SNAC registration server 122, the IDM server 120, and a combination of these components. In addition, or alternatively, the methods 200-400 may comprise machine-readable instructions stored on a non-transitory computer readable storage medium that is implemented or executed by any one or more of the switch 108, the SNAC registration server 122, the DM server 120, and a combination of these components.

With reference first to FIG. 2, there is shown a flow diagram of a method 200 for managing access to a network 110, according to an example. At block 202, a user 104 is enabled to self-register a user device 106 into a database of authorized users 128 to access the network 110 in response to the user 104 being listed as a valid user in a directory of active network users 136, 142. According to an example, the self-registration is enabled through a MAC based authentication operation. Various manners in which the self-registration operation may be implemented are described in greater detail herein below with respect to the method 300 in FIG. 3.

At block 204, the directory of active network users 136, 142 is monitored for modification of information pertaining to the users listed in the directory of active network users 136, 142. As discussed above, the directory of active network users may comprise one or both of the active directory 136 and the guest directory 142. In addition, various manners in which the directory of active network users 136, 142 may be monitored are described in greater detail herein below with respect to the method 400 in FIG. 4.

At block 206, the database of authorized users 128 is modified in response to a determination that the user information pertaining to at least one user listed in the directory of active network users 136, 142 that affects the database of authorized users 128 has been modified. Various manners in which the database of authorized users 128 may be modified based upon modifications to the directory of active network users 136, 142 that affect the user information contained in the database of authorized users 128 are also described in greater detail herein below with respect to the method 400 in FIG. 4.

Turning now to FIG. 3, there is shown a flow diagram of a method 300 for enabling a user to self-register a user device into a database of authorized users 128 to access the network 110, according to an example. The method 300 generally comprises a more detailed description of the operations that may be performed at block 202 in FIG. 2.

At block 302, user device information 106DI of the user 104 requesting access to the network 110 is received. The user device information 106DI may be, for instance, the MAC address of the user device 106. In addition, the user device 106 may automatically communicate the user device information 106DI to the switch 108 when the user device 106 is coupled to the switch 108, for instance, during a handshake operation between the switch 108 and the user device 106.

More generally, the user device information 106DI may comprise a set of data associated with the user device 106 and may serve to uniquely identify the user device 106 to the network 110. In some cases, redundant or additional information may be employed, or added, in order to further identify the user device 106 or to limit, control, or constrain the association of the user device 106 with the network 110. For example, a port identifier on the switch 108 may be combined with the MAC address of the user device 106 to form a combined or multi-signature user device information 106DI. Similarly, a specific frequency or channel may be associated with a wireless device in order to form a combined or multi-signature user device information 106DI. In some cases, however, some leeway may be granted in assigning a user device information 106DI. For example, a wireless user device 106 may still be granted access to the network 110 if it is associated with two or more wireless access points (that is, wireless switches 108), provided those multiple access points are substantially in proximity to each other.

At block 304, a determination as to whether the database of authorized users 128 includes the user device information 106DI is made. As shown in FIG. 1, and according to an example, the switch 108 is to implement the RADIUS server 112 ("MAC-AUTH" line) in making the determination as to whether the database of authorized users 128 includes the user device information 106DI. Alternatively, however, the SNAC registration server 122 and/or the IDM server 120 may make this determination.

In response to a determination that the database of authorized users 128 does include the user device information 106DI, access to the network 110 is granted to the user 104 through the user device 106, as indicated at block 306. Specific access and control rights may be determined by IDM agent 116 in conjunction with IDM policy database 124. However, if a determination that the database of authorized users 128 does not include the user device information 106DI, at block 308, user information 104UI is received. More particularly, for instance, the user 104 may be prompted to input the user information 104UI, such as, a user name, user identification, password, and/or other credentials, and the user 104 may input the requested user information 104UI. In addition, the switch 108 may redirect the user information 104UI to the SNAC registration server 122 as indicated by the line labeled "MAC-AUTH-FAILURE-REDIRECT".

At block 310, a determination as to whether the user information 104UI is valid in the directory of active network users 136, 142 is made, for instance, by the SNAC registration server 122 following receipt of the user information 104UI. Thus, for instance, a determination as to whether the user information 104UI is contained in the directory of active network users 136, 142 is made and if so, whether the user 104 has inputted the correct credentials, for instance, the correct password, and is enabled to access the network 110 is made. By way of example, and as shown in FIG. 1, the active directory table 138 contained in the active directory 136 shows that the user "Jane Doe" is enabled to access the network 110 and that here password is "123RF34". It will be noted that the Active Directory 136, Guest Directory 142, or similar directories of active network users are typically populated, maintained, and updated by an authorized administrator or other person(s) responsible for ensuring legitimate network access. For example, an authorized organizational staff member may be designated to populate Guest Directory 142 with names and other identifying information 104UI for network users 104 who will be guests, and who will therefore be permitted guest or temporary access to the network 110.

In response to a determination that the user information 104UI supplied by the user at block 308 is invalid, access to the network 110 is denied as indicated at block 312. Thus, if the user information 104UI is not contained in the directory of active network users 136, 142, if the user information 104UI, for instance, the password, does not match the user information 104UI contained in the directory of active network users 136, 142, and/or if the user's 104 network access has been disabled, access to the network is automatically denied at block 312. In addition, suitable additional steps may be taken. For example, a user 104 may be prompted to re-enter user information 104UI (on the possibility that the information was entered incorrectly a first time), or an alert may be sent to an administrator or designated organizational administrator. Policies for responding to incorrect or erroneous user information 104UI may be defined in IDM policy database 124, and implemented by processes such as RADIUS server 112 and/or IDM agent 116.

In response to a determination that the user information 104UI supplied by the user at block 308 is valid, the user information 104UI is registered into the database of authorized users 128, as indicated at block 314. In other words, the user information 104UI is automatically populated into the list of authorized users 130 in the database of authorized users 128. In this regard, the user 104 may be granted access to the network 110 through the user device 106 without requiring the direct support or intervention of an administrator. From the perspective of the user 104, the self-registration operation of the method 300 may be implemented via a log-in process and log-in displays.

In addition, along with the user information 104UI, and associated with it, is added the user device information 106DI for the device 106. If the user 104 is already present in the list of authorized users 130 (indicating another user device 106 is already associated with the user 104), then newly added device 106 and its user device information 106DI may also be associated with the same user 104. In an example, when the user information 104UI is added to the list of authorized users 130, all of the provided user information 104UI is added. In another example, when the user information 104UI is added to the list of authorized users 130, only a subset of the user information 104UI is added.

In addition, the user 104 is granted access to the network 100 as indicated at block 306, which has been described herein above.

By way of particular example, once the user's credentials are verified and the user 104 is determined to be a valid user at block 310, the SNAC registration server 122 adds the user information 104UI to the IDM server 120. In addition, the IDM server 120 pushes the user information 104UI to all of the IDM agents 116. An IDM agent 116 registers the user information 104UI into the database of authorized users 128 as discussed above. Subsequent access to the network 110 through the user device 106 will now occur automatically as the user 104 is immediately allowed access with the appropriate access rights based on their IDM group, profile, etc. In addition, from this point forward, the user 104 is unaware that SNAC is being implemented since the user's 104 access to the network 110 through the user device 106 is transparent to the user 104. As discussed in greater detail below with respect to the method 400 in FIG. 4, when the user's access rights change, such as, when the user leaves a company, that change is automatically reflected in the database of authorized users 128 since the IDM server 120 is monitoring the directory of active network users 136, 142 for changes.

With reference now to FIG. 4, there is shown a flow diagram of a method 400 for ongoing management of a user 104 and user device 106 already granted access to a network 110 as per the method 200 discussed above. The method 400 generally comprises a more detailed description of the operations that may be performed at blocks 204 and 206 in FIG. 2. In this regard, the method 400 may be implemented following implementation of block 202. In addition, the method 400 may involve a single process, or may involve multiple processes occurring substantially in parallel or in alternating sequence. FIG. 4 depicts two processes. According to an example, the SNAC registration server 122 and/or the IDM server 120 implements various operations in the method 400.

In a first process starting at block 402, the directory of active network users 136, 142 is monitored in substantially real time, on a substantially continuous or frequent basis. At decision block 404, a determination is made as to whether a user 104 has been deleted from the directory of active network users 136, 142. Such a deletion may be made by an administrator or other person or entity authorized to control access to the network 110.

If a user 104 has been deleted, at block 406, any record or similar listing of the user 104 in the database of authorized users 128 is deleted, as is the listing of any associated user device information 106DI from the listing of authorized users 130. This effectively prevents these user devices 106 from logging into the network 110 in the future, as per methods 200/300 discussed above. In addition, if any of the deleted user devices 106 are currently connected to the network 110, their network connection may be terminated.

If, however, at decision block 404, a determination is made that the user 104 is still listed in the directory of active network users 136, 142, at block 408, a determination is made if the user 104 has been disabled in the directory of active network users 136, 142. Such a status may be set by an administrator or other person or entity authorized to control access to the network 110.

If a user 104 has had their activity status set to disabled, at block 410, a determination is made if any user devices 106 for the user 104 are currently contained in the database of authorized users 128. If yes, at block 412, and according to an example, if any such user devices 106 currently have active network connections, their network connection is terminated. In addition, the user information 104UI and user device information 106DI are deleted from the list of authorized users 130 contained in the database of authorized users 128. In another example, instead of the user information 104UI and user device information 106DI being deleted from the database of authorized users 128, a flag may be set in the list of authorized users 130 indicating that the user device(s) 106 are not currently authorized to access the network 110. This may prevent the user devices 106 from being logged into the network 110 during the method 200 and may trigger the self-registration process of the method 300. If, however, at block 410, the user 104 is not listed in the database of authorized users 128, then no specific action is required with respect to the database of authorized users 128, and monitoring continues as per block 402.

If at decision block 408, a determination is made that a user 104 remains active in the directory of active network users 136, 142, at block 414, a determination is made as to whether any other aspects of parameters for the user 104 have been changed in the directory of active network users 136, 142. If yes, at block 416, appropriate changes are made to the database of authorized users 128, and user device 106 network access or network privileges may be modified as appropriate. For example, network access privileges may be increased or decreased, access domains changed, network control authority changed, and other changes made as appropriate. Some changes may be determined based on changes in the directory of active network users 136, 142 in conjunction with policies set in IDM policy database 124, as appropriate.

In an example second process starting at block 418, a user time limit and/or date limit set in the directory of active network users 136, 142 is noted, and the appropriate time and or date is monitored. For example, a date limit may indicate that a user 104 is only entitled to access to the network for a specific date, such as May 1. The current date is determined, as well as whether or not the corresponding user device 106 is in use.

At decision block 420, a determination is made if the user time limit or user date boundaries have been exceeded. If yes, then at block 422 network access through the user device 106 is terminated by removing the user information 104UI and the associated user device information 106DI are deleted from the list of authorized users 130 in the database of authorized users 128, preventing future logins through the user device 106, In general, the methods 200-400 may be implemented to determine if more than one user device 106 with a same user device information, or a single device with an erroneous user device information, attempts to connect to the network 110. In such cases, an alert may be sent to an administrator indicating that an attempt at device spoofing may be in progress, and one or more user devices 106 may be denied access or have existing access challenged. Specific policies to detect spoofing and other erroneous self-identifications may be defined on IDM policy database 124, and implemented by IDM agent 116.

Some or all of the operations set forth in the methods 200-400 may be contained as a utility, program, or subprogram, in any desired computer accessible medium. In addition, the methods 200-400 may be embodied by computer programs, which may exist in a variety of forms both active and inactive. For example, they may exist as machine-readable instructions, including source code, object code, executable code or other formats. Any of the above may be embodied on a computer readable storage medium.

Examples of non-transitory computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
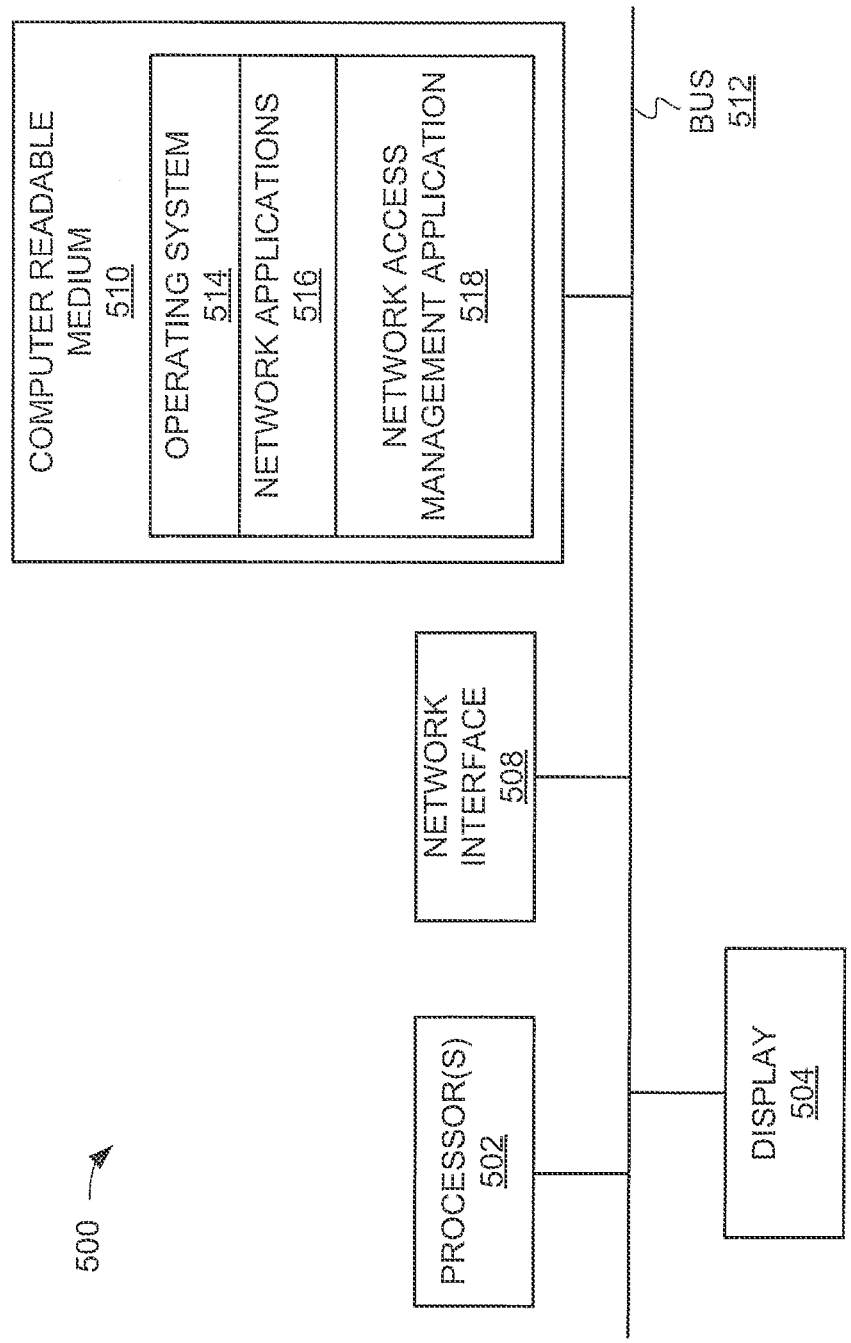
FIG. 5 illustrates a schematic representation of a computing device, which may be employed to perform various functions of devices depicted in FIG. 1, according to an example of the present disclosure.

Turning now to FIG. 5, there is shown a schematic representation of a computing device 500, which may be employed to perform various functions of the servers 120, 122 depicted in FIG. 1, according to an example. Similar elements, possibly with some elements omitted or added, may also be employed within an intelligent switch, such as switch 108 in FIG. 1. Computing device 500 includes a processor 502; a display device 504, such as a monitor; a network interface 508, such as a Local Area Network LAN, a wireless 802.11x LAN, a 3G mobile WAN or a WiMax WAN; and a computer-readable medium 510. Each of these components is operatively coupled to a bus 512. For example, the bus 512 may be an EISA, a PCI, a USB, a FireWire, a NuBus, or a PDS.

The computer readable medium 510 may be any suitable non-transitory medium that participates in providing instructions to the processor 502 for execution. For example, the computer readable medium 510 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 510 may also store other machine-readable instructions, including word processors, browsers, email, Instant Messaging, media players, and telephony machine-readable instructions.

The computer-readable medium 510 may also store an operating system 514, such as Mac OS, MS Windows, Unix, or Linux; network applications 516; and a network access management application 518. The operating system 514 may be multi-user, multiprocessing, multitasking, multi-threading, real-time and the like. The operating system 514 may also perform basic tasks such as recognizing input from input devices, such as a keyboard or a keypad; sending output to the display 504; keeping track of files and directories on the computer readable medium 510; controlling peripheral devices, such as disk drives, printers, image capture device; and managing traffic on the bus 512. The network applications 516 include various components for establishing and maintaining network connections, such as machine-readable instructions for implementing communication protocols including TCP/IP, HTTP, Ethernet, USB, and FireWire.

The network access management application 518 provides various components for managing access to a network 110, as described above with respect to the methods 200-400 in FIGS. 2-4. The network access management application 518, when implemented, receives on a network device 108/120/122 a user device identification 106DI from a user device 106 requesting access to the network 110. The network access management application 518, when implemented, further enables a user 104 to self-register the user device 106 into a database of authorized users 128 in response to the user being listed as a valid user in a directory of active network users 136, 142. In addition, the network access management application 518, when implemented, monitors the directory of active network users 136, 142 for modification of information pertaining to the users listed in the directory of active network users 136, 142. Moreover, the database of authorized users 128 is modified in response to a determination that user information pertaining to at least one user listed in the directory of active network users 136, 142 that affects the database of authorized users 128 has been modified. In certain examples, some or all of the processes performed by the network access management application 518 may be integrated into the operating system 514. In certain examples, the processes may be at least partially implemented in digital electronic circuitry, or in computer hardware, machine-readable instructions (including firmware and/or software), or in any combination thereof.

Although described specifically throughout the entirety of the instant disclosure, representative embodiments of the present disclosure have utility over a wide range of applications, and the above discussion is not intended and should not be construed to be limiting, but is offered as an illustrative discussion of aspects of the disclosure.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method of managing access to a network, said method comprising:
    implementing a media access control (MAC) based authentication operation in determining whether to grant a user device of a user access to the network;
    enabling the user to self-register the user device into a database of authorized users to access the network in response to the user being denied access to the network through the MAC based authentication operation and being listed as a valid user in a directory of active network users;
    monitoring, by a processor with memory, the directory of active network users for modification of information pertaining to the users listed in the directory of active network users;
    modifying, by the processor with memory, the database of authorized users in response to a determination that user information pertaining to at least one user listed in the directory of active network users that affects the database of authorized users has been modified; and
    removing, by the processor with memory, the user from the database of authorized users upon a determination either that the user has been deleted from the directory of active network users or that the user has been disabled in the directory of active network users.

2. The method according to claim 1, wherein implementing the MAC based authentication operation further comprises:
    receiving user device information of the user device;
    determining whether the database of authorized users includes the user device information; and
    in response to a determination that the database of authorized users includes the user device information, granting access to the network for the user device.

3. The method according to claim 2, further comprising:
    in response to a failure of the user to be authenticated through the MAC based authentication operation,
    receiving user information;
    determining whether the user information is valid in the directory of active network users;
    in response to a determination that the user information is valid in the directory of active network users, registering the user information for the user in the database of authorized users; and
    in response to a determination that the user information is not valid in the directory of active network users, denying access by the user device to the network.

4. The method according to claim 1, further comprising:
    determining whether a modification of information pertaining to the users listed in the directory of active network users affects an access right of the user in the database of authorized users; and
    wherein modifying the database of authorized users further comprises modifying the database of authorized users to modify information pertaining to the user listed in the directory of active network users in response to a determination that the modification of information pertaining to the users listed in the directory of active network users affects an access right of the user.

5. A non-transitory computer readable storage medium on which is embedded a computer program, said computer program implementing a method of managing access to a network, said computer program comprising computer readable code to:
    enable a user to self-register a user device into a database of authorized users to access the network in response to the user being listed as a valid user in a directory of active network users;
    monitor the directory of active network users for modification of information pertaining to the users listed in the directory of active network users;

modify the database of authorized users in response to a determination that user information pertaining to at least one user listed in the directory of active network users that affects the database of authorized users has been modified; and automatically remove the user from the database of authorized users upon a determination either that the user has been deleted from the directory of active network users or that the user has been disabled in the directory of active network users.

6. The non-transitory computer readable storage medium of claim 5, wherein said computer program further comprises computer readable code to:

implement a media access control (MAC) based authentication operation in determining whether to grant a user device of a user access to the network; and wherein the user is enabled to self-register the user device in response to a failure of the user to be authenticated through the MAC based authentication operation.

7. The non-transitory computer readable storage medium of claim 6, wherein said computer program further comprises computer readable code to:

receive user device information of the user device;

determine whether the database of authorized users includes the user device information; and in response to a determination that the database of authorized users includes the user device information, grant access to the network for the user device.

8. The non-transitory computer readable storage medium of claim 7, wherein said computer program further comprises computer readable code to:

receive user information in response to a failure of the user to be authenticated through the MAC based authentication operation;

determine whether the user information is valid in the directory of active network users;

in response to a determination that the user information is valid in the directory of active network users, register the user information for the user in the database of authorized users; and in response to a determination that the user information is not valid in the directory of active network users, deny access by the user device to the network.

9. The non-transitory computer readable storage medium of claim 5, wherein said computer program further comprises computer readable code to:

determine whether a modification of information pertaining to the users listed in the directory of active network users affects an access right of the user in the database of authorized users; and modify the database of authorized users to modify information pertaining to the user listed in the directory of active network users in response to a determination that the modification of information pertaining to the users listed in the directory of active network users affects an access right of the user.

10. A network device comprising:

a module for managing user access to a network; and a processor with memory for implementing the module to cause the network device to:

manage a database of authorized users to access the network;

automatically populate the database of authorized users with user information in response to a request by a user for access to the network and the user being listed as a valid user in a directory of active network users, wherein the user is denied access to the network unless the user is listed in the database of authorized users;

and automatically remove the user from the database of authorized users upon a determination either that the user has been deleted from the directory of active network users or that the user has been disabled in the directory of active network users.

11. The network device according to claim 10, wherein the module is further to determine whether to grant a user device access to the network through implementation of a media access control (MAC) based authentication operation, wherein the module is further to receive user device information of the user device, determine whether the database of authorized users includes the user device information, and in response to a determination that the database of authorized users includes the user device information, grant access to the network for the user device in implementing the MAC based authentication operation.

12. The network device according to claim 10, wherein the module is further to:

receive user information in response to a failure of the user to be authenticated through the MAC based authentication operation;

determine whether the user information is valid in the directory of active network users;

in response to a determination that the user information is valid in the directory of active network users, register the user information for the user in the database of authorized users; and in response to a determination that the user information is not valid in the directory of active network users, deny access by the user device to the network.

13. The network device according to claim 10, wherein the module is further to:

determine whether a modification of information pertaining to the users listed in the directory of active network users affects an access right of the user in the database of authorized users; and modify the database of authorized users to modify information pertaining to the user listed in the directory of active network users in response to a determination that the modification of information pertaining to the users listed in the directory of active network users affects an access right of the user.

* * * * *